United States Patent
Kamada (10) Patent No.: US 10,625,814 B2
(45) Date of Patent: Apr. 21, 2020

(54) BICYCLE CRANK ASSEMBLY

(71) Applicant: Shimano Inc., Sakai, Osaka (JP)

(72) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 48 days.

(21) Appl. No.: 15/160,479

(22) Filed: May 20, 2016

(65) Prior Publication Data

US 2016/0368561 A1 Dec. 22, 2016

(30) Foreign Application Priority Data

Jun. 16, 2015 (DE) .................... 20 2015 004 263 U
Sep. 30, 2015 (DE) ....................... 10 2015 012 754

(51) Int. Cl.
*B62M 3/00* (2006.01)
*B62M 9/10* (2006.01)
*B62M 9/00* (2006.01)

(52) U.S. Cl.
CPC .............. *B62M 3/00* (2013.01); *B62M 9/105* (2013.01); *B62M 9/00* (2013.01)

(58) Field of Classification Search
CPC ........... B62M 3/00; B62M 9/105; B62M 9/00
See application file for complete search history.

(56) References Cited

U.S. PATENT DOCUMENTS

| | | | | | |
|---|---|---|---|---|---|
| 4,331,043 | A * | 5/1982 | Shimano | ............... | B62K 19/34 |
| | | | | | 74/594.2 |
| 6,340,338 | B1 * | 1/2002 | Kamada | .................. | B62M 9/10 |
| | | | | | 474/152 |
| 8,677,859 | B2 * | 3/2014 | Yamanaka | ............... | B62M 3/00 |
| | | | | | 74/594.1 |
| 2007/0207631 | A1 * | 9/2007 | Meggiolan | ............. | B62M 3/003 |
| | | | | | 439/55 |
| 2013/0098197 | A1 * | 4/2013 | Chen | ........................ | B62M 3/00 |
| | | | | | 74/594.2 |
| 2014/0128191 | A1 * | 5/2014 | Bohm | ...................... | B62M 1/36 |
| | | | | | 474/82 |
| 2015/0080160 | A1 * | 3/2015 | Staples | .................... | B62M 9/10 |
| | | | | | 474/160 |
| 2016/0144929 | A1 * | 5/2016 | Staples | .................... | B62M 9/10 |
| | | | | | 474/160 |
| 2016/0362159 | A1 * | 12/2016 | Braedt | ..................... | B62M 9/10 |

OTHER PUBLICATIONS

SRAM 2017 Road, pp. 1-102; Hope Technology 2015 p. 103; Raceface pp. 104-108; Shimano Inc. vol. 2.3 Apr. 2, 2018.*

* cited by examiner

*Primary Examiner* — Vicky A Johnson
(74) *Attorney, Agent, or Firm* — Global IP Counselors, LLP (57) ABSTRACT

A bicycle crank assembly has a sprocket, a first crank arm, a second crank arm and a crank axle, A first axial distance is defined between the first pedal attachment surface and the second pedal attachment surface in an axial direction. A second axial distance is defined between the first transverse center plane of the sprocket and the second axial center plane of the crank axle in the axial direction. The first axial distance is smaller than or equal to 170 mm. The second axial distance is larger than or equal to 55 mm.

10 Claims, 6 Drawing Sheets

| Pattern | A | B | C | D | E | F | G |
|---|---|---|---|---|---|---|---|
| 1st | 46T | 42T | 46T | 46T | 46T | 40T | 48T |
| 2nd | 37T | 37T | 40T | 40T | 40T | 35T | 42T |
| 3rd | 31T | 32T | 35T | 35T | 34T | 31T | 36T |
| 4th | 27T | 28T | 31T | 30T | 30T | 27T | 32T |
| 5th | 24T | 24T | 27T | 26T | 26T | 24T | 28T |
| 6th | 21T | 21T | 24T | 22T | 22T | 21T | 24T |
| 7th | 19T | 19T | 21T | 19T | 20T | 19T | 21T |
| 8th | 17T | 17T | 18T | 17T | 18T | 17T | 19T |
| 9th | 15T | 15T | 15T | 15T | 16T | 15T | 16T |
| 10th | 13T | 13T | 13T | 13T | 14T | 13T | 13T |
| 11th | 11T | 11T | 11T | 11T | 12T | 11T | 11T |

| Pattern | A | B | C | D | E | F | G |
|---|---|---|---|---|---|---|---|
| 1st | 46T | 42T | 46T | 46T | 46T | 40T | 48T |
| 2nd | 37T | 37T | 40T | 40T | 40T | 35T | 42T |
| 3rd | 31T | 32T | 35T | 35T | 34T | 31T | 36T |
| 4th | 27T | 28T | 31T | 30T | 30T | 27T | 32T |
| 5th | 24T | 24T | 27T | 26T | 26T | 24T | 28T |
| 6th | 21T | 21T | 24T | 22T | 22T | 21T | 24T |
| 7th | 19T | 19T | 21T | 19T | 20T | 19T | 21T |
| 8th | 17T | 17T | 18T | 17T | 18T | 17T | 19T |
| 9th | 15T | 15T | 15T | 15T | 16T | 15T | 16T |
| 10th | 13T | 13T | 13T | 13T | 14T | 13T | 13T |
| 11th | 11T | 11T | 11T | 11T | 12T | 11T | 11T |

FIG. 6

BICYCLE CRANK ASSEMBLY

CROSS-REFERENCE TO RELATED APPLICATIONS

This application claims priority under 35 U.S.C. § 119 to German Utility Model Application No. 202015004263.5, filed Jun. 16, 2015, and German Patent Application No. 102015012754.3, filed Sep. 30, 2015. The entire disclosures of these priority applications are hereby incorporated herein by reference.

BACKGROUND

Field of the Invention

This invention generally relates to a bicycle crank assembly. More specifically, the present invention relates to a bicycle crank assembly.

Background Information

In a conventional bicycle, a wide tire could be attached to a bicycle frame according to users' needs. When the user tries to attach the wide tire to a rear end of the frame, an upper limit of a width of the wide tire is determined by a width of the rear end.

But a chain may come into contact with a chain stay, if the width of the rear end is simply increased to install a wider tire to the rear end without consideration of the configuration of a crank assembly. In other words, the configuration of the crank assembly is important for installing the wider tire to the rear end.

In consideration of the problem, it is an object of the present invention to provide a bicycle crank assembly capable of installing a wider tire to a frame adequately.

SUMMARY

In view of the state of the known technology and in accordance with a first aspect of the present disclosure, a bicycle crank assembly disclosed herein includes a rotational center axis. The bicycle crank assembly comprises a sprocket, a first crank arm, a second crank arm, and a crank axle. The sprocket includes a first transverse center plane that is transverse to the rotational center axis. The first crank arm includes a first pedal attachment surface. The second crank arm includes a second pedal attachment surface. The crank axle includes a second transverse center plane that is transverse to the rotational center axis.

The first pedal attachment surface is spaced from the second pedal attachment surface in an axial direction parallel to the rotational center axis by a first axial distance that is smaller than or equal to 170 mm. The first transverse center plane of the sprocket is spaced from the second transverse center plane of the crank axle in the axial direction by a second axial distance is larger than or equal to 55 mm.

This bicycle crank assembly prevents a chain from contacting to a chain stay by setting the first and second axial distances as above, even if a width of a rear end of a frame is increased to install a wider tire to the rear end. In other words, the wider tire can be installed adequately to the frame by the bicycle crank assembly.

In accordance with a second aspect of the present invention, the bicycle crank assembly can be configured as follows. The first axial distance is smaller than or equal to 165 mm.

In the bicycle crank assembly, the wider tire can be installed adequately to the frame by setting the first axial distances so as to be smaller than or equal to 165 mm.

In accordance with a third aspect of the present disclosure, the bicycle crank assembly can be configured as follows. The second axial distance is larger than or equal to 57 mm.

In the bicycle crank assembly, the wider tire can be installed adequately to the frame by setting the second axial distances so as to be larger than or equal to 57 mm.

In accordance with a fourth aspect of the present disclosure, the bicycle crank assembly can be configured as follows. The first axial distance is larger than or equal to 90 mm.

In the bicycle crank assembly, the wider tire can be installed adequately to the frame by setting the first axial distances no as to be larger than or equal to 90 mm.

In accordance with a fifth aspect of the present disclosure, the bicycle crank assembly can be configured as follows. The second axial distance is smaller than or equal to 85 mm.

In the bicycle crank assembly, the wider tire can be installed adequately to the frame by setting the second axial distances so as to be smaller than or equal to 85 mm.

In accordance with a sixth aspect of the present disclosure, the bicycle crank assembly can be configured as follows. The total number of the sprocket consists of one.

The configuration of the sprocket enables the bicycle crank assembly to be downsized in the axial direction.

In accordance with a seventh aspect of the present disclosure, the bicycle crank assembly can be configured as follows. The second axial distance is smaller than the first axial distance.

The wider tire can be installed more adequately to the frame by a definition of the relationship between the first and second axial distances.

In accordance with an eighth aspect of the present disclosure, the bicycle crank assembly can be configured as follows. The first transverse center plane and the second transverse center plane are positioned between the first pedal attachment surface and the second pedal attachment surface in the axial direction.

The wider tire can be installed more adequately to the frame by a positional definition of the first and second transverse center planes.

In accordance with a ninth aspect of the present disclosure, the bicycle crank assembly can be configured as follows. The first pedal attachment surface and the second pedal attachment surface face outwardly from the second transverse center plane in the axial direction respectively.

The wider tire can be installed more adequately to the frame by a definition of the first and second pedal attachment surfaces.

In accordance with a tenth aspect of the present disclosure, the bicycle crank assembly can be configured as follows. The crank axle includes a first axial end surface and a second axial end surface opposite to the first axial end surface with respect to the second transverse center plane. The second transverse center plane is positioned in the axially midst between the first axial end surface and the second axial end surface.

The wider tire can be installed more adequately to the frame by a positional definition of the second transverse center plane with the first and second axial end surfaces.

Also other objects, features, aspects and advantages of the disclosed bicycle crank assembly will become apparent to those skilled in the art from the following detailed description, which, taken in conjunction with the annexed drawings, discloses selected embodiments of the bicycle crank assembly.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

Figure 1:
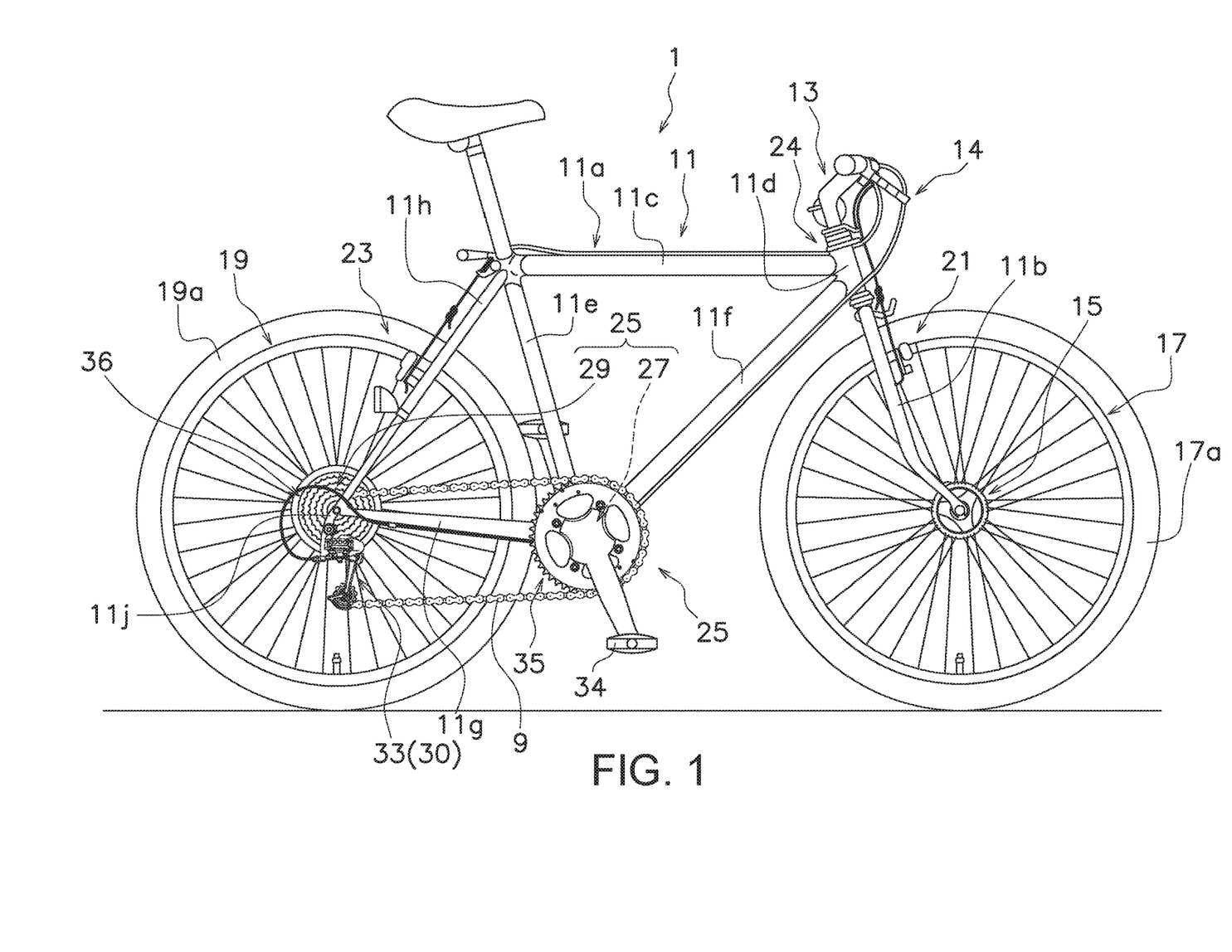
FIG. 1 is a side elevational view of a bicycle including a crank assembly and a rear hub assembly according to one illustrated embodiment.

As shown FIG. 1, a bicycle 1 includes a frame 11, a handlebar 13, a front hub assembly 15, a front wheel 17, a rear wheel 19, a front brake device 21, a rear brake device 23, a driving portion 25 (including a crank assembly 27 and, a rear hub assembly 29) and a gear change portion 30.

The frame 11 includes a frame body 11a and a front fork 11b. The frame body 11a includes a top tube 11c, a head tube 11d, a seat tube 11e, a down tube 11f, a pair of chain stays 11g, a pair of seat stays 11h, and a bottom bracket hanger 12 (see FIGS. 2 and 3). A connection portion of the seat stay 11h and the chain stay 11g is described as a rear end 11j below.

The front fork 11b is rotatably attached to the head tube 11d of the frame body 11a. The handlebar 13 is fixed to the front fork 11b.

The front hub assembly 15 is supported on the front fork 11b. The front wheel 17 is rotatably attached to the front fork 11b through the front hub assembly 15. The rear wheel 19 is rotatably attached to a rear portion of the frame 11 (the frame body 11a) through the rear hub assembly 29. A front tire 17a is attached to the front wheel 17. A rear tire 19a is attached to the rear wheel 19. For example, a width of the rear tire 19a is 2.8 inch.

The front and rear brake devices 21 and 23 are operated by manipulation of one of a pair of brake levers 14 (only one shown in FIG. 1). The gear change portion 30 is attached to the frame 11 (the frame body 11a). The gear change portion 30 includes a rear derailleur 33. The rear derailleur 33 moves the bicycle chain 9 from a rear sprocket to an adjacent rear sprocket by a shift operation of a shift lever (not shown) attaching to, e.g. the right side of the handle 13. The rear derailleur 33 is, for example, attached to a rear portion of the frame 11 (the frame body 11a).

Figure 2:
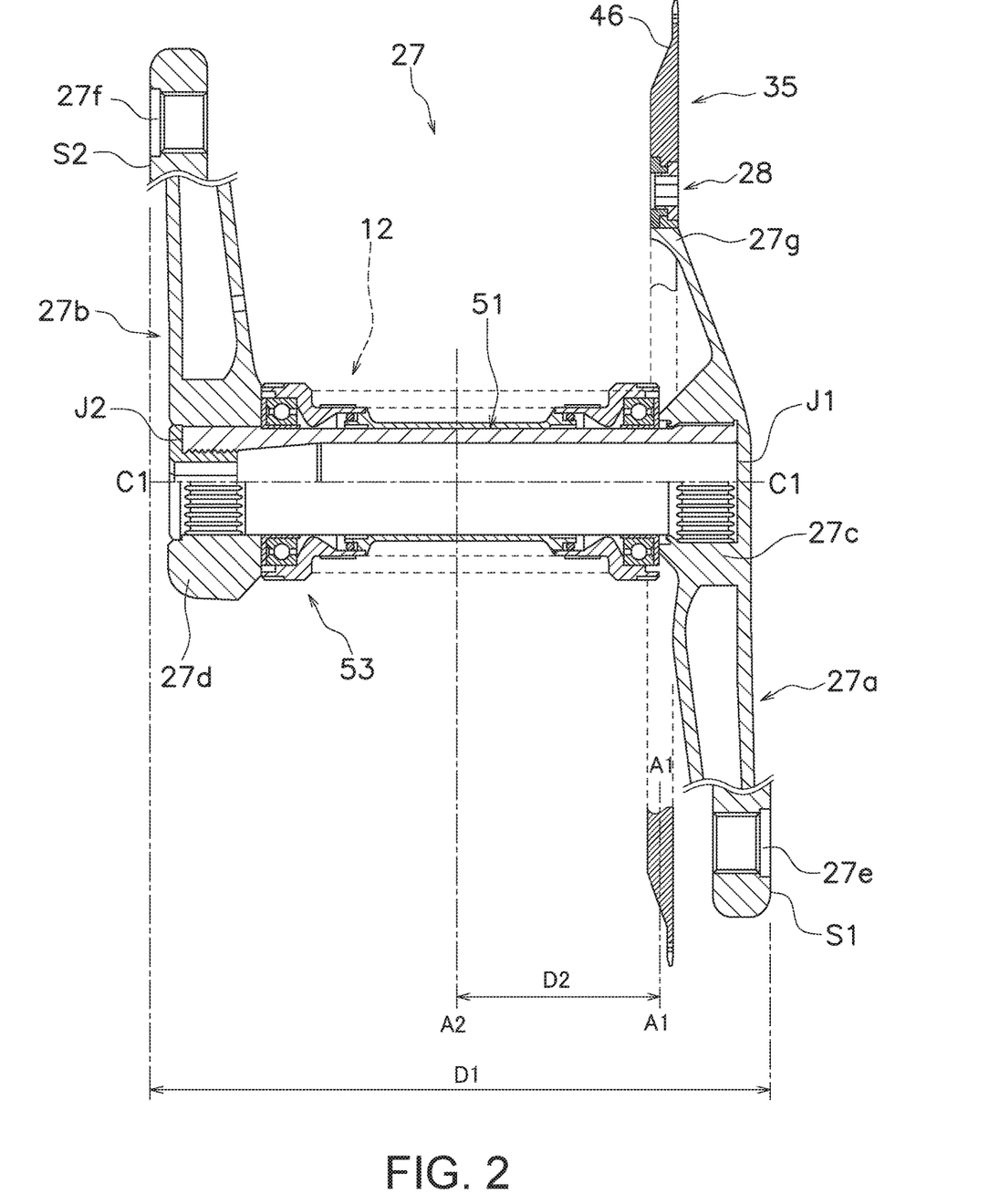
FIG. 2 is a cross sectional view of the crank assembly illustrated in FIG. 1 according to the illustrated embodiment.

The driving portion 25 mainly includes the crank assembly 27 and the rear hub assembly 29 as mentioned above. As shown in FIGS. 1 and 2, the crank assembly 27 is rotatably supported on a lower portion of the frame 11, for example, by the bottom bracket hanger 12. As shown in FIG. 2, the crank assembly 27 mainly includes a crank axle 51, a right crank arm 27a (an example of a first crank arm), a left crank arm 27b (an example of a second crank arm), and a front sprocket assembly 35. The crank axle 51 is rotatably supported on the bottom bracket hanger 12 via a bottom bracket assembly 53.

The right crank arm 27a and the left crank arm 27b are mounted on opposite ends of the crank axle 51. For example, a crank axle mounting portions 27c of the right crank arm 27a is attached fixedly to one end of the crank axle 51 with a spline engagement. A crank axle mounting portion 27d of the left crank arm 27b is attached fixedly to the other end of the crank axle 51 with a spline engagement and an axle bolt. As shown in FIGS. 1 and 2, a pedal 34 is attached to each of a pedal axle mounting portions 27e of the right crank arm 27a and a pedal axle mounting portions 27e of the left crank arm 27b.

As shown in FIG. 2, the front sprocket assembly 35 is attached to the right crank arm 27a on as to be integrally rotatable with the right crank arm 27a, The front sprocket assembly 35 includes at least one front sprocket 45 (an example of a sprocket). In this embodiment, the total number of the front sprocket 45 is one. The front sprocket 45 is attached to a radially outside portion 27g of the crank axle mounting portions 27c of the right crank arm 27a with a plurality of fixing members 28. Each of the fixing members 28 can be a removable fastener such as a bolt and a nut (see FIG. 2).

Figure 3:
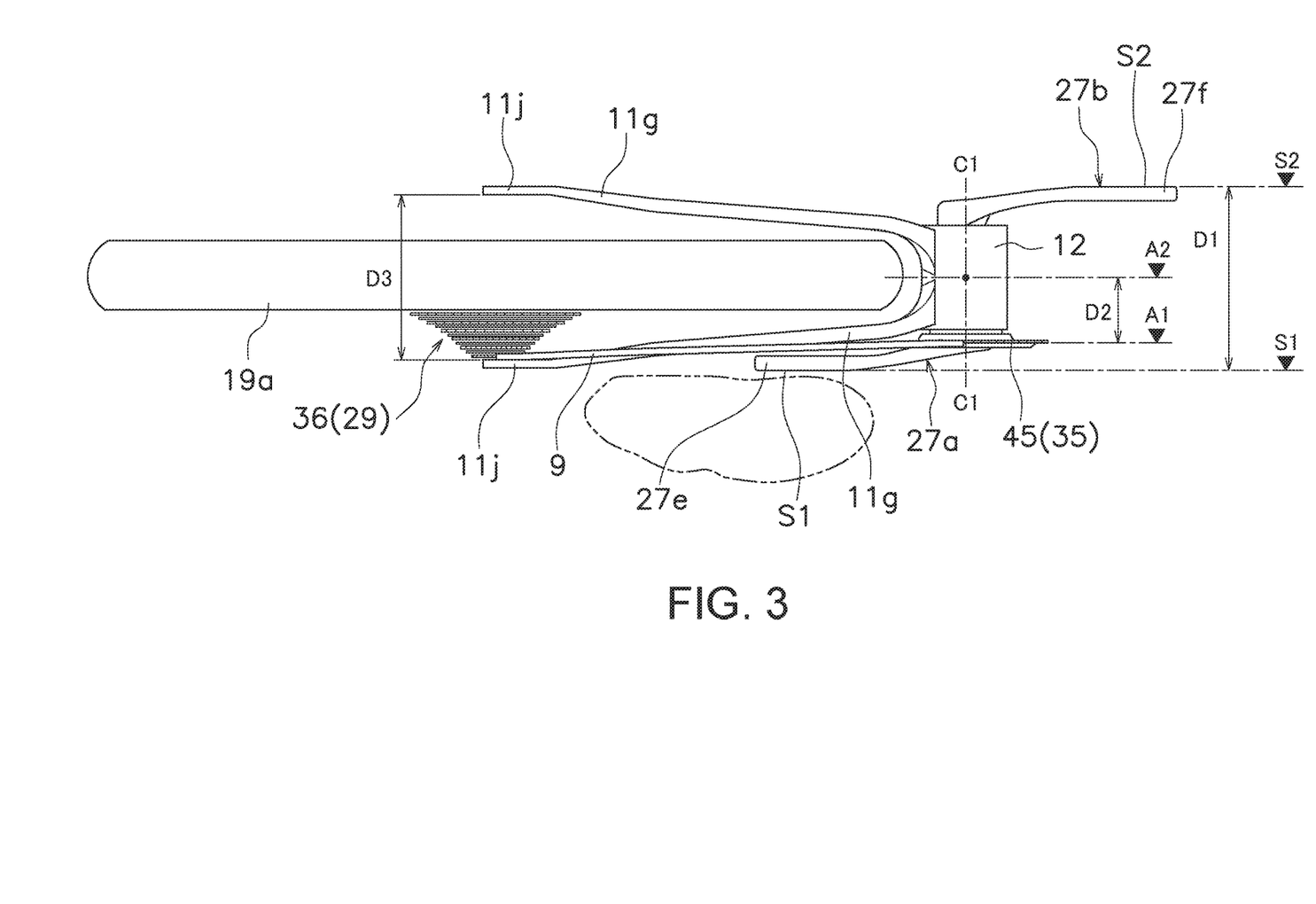
FIG. 3 is a partial top view of a rear portion of the bicycle illustrated in FIG. 1 as viewed from above and looking down.

The configuration of the crank assembly 27 is arranged as follows. As shown in FIGS. 2 and 3, the crank assembly 27 includes a rotational center axis C1. The rotational center axis C1 corresponds to a rotational center axis of the crank axle 51.

The front sprocket 45 includes a first transverse center plane A1 that bisects the front sprocket 45 with respect to an axial direction of rotation of the front sprocket 45. The first transverse center plane A1 passes through a center of the front sprocket 45 in a transverse that is perpendicular to the rotational center axis C1. The axial direction is a direction in which the rotational center axis C1 extends. In other words, the axial direction is a direction parallel to the rotational center axis C1.

As shown in FIG. 2, the crank axle 51 includes a second transverse center plane A2, a first axial end surface J1, and a second axial end surface J2.

The second transverse center plane A2 is positioned in the axial middle between the first axial end surface J1 and the second axial end surface J2. The second transverse center plane A2 passes through a center of the bottom bracket hanger 12 in the transverse direction that is perpendicular to the rotational center axis C1.

The first axial end surface J1 is a distal surface of the crank axle 51 in one end side thereof. The first axial end surface J1 is substantially parallel to the second transverse center plane A2.

The second axial end surface J2 is opposite to the first axial end surface J1 with respect to the second transverse center plane A2. For example, the second axial end surface J2 is a distal surface of the crank axle S1 in the other end side thereof. The second axial end surface J2 is substantially parallel to the second transverse center plane A2.

The right crank arm 27a includes a first pedal attachment surface S1. The first pedal attachment surface S1 is provided on the right crank arm 27a.

Specifically, the first pedal attachment surface S1 is provided on the pedal axle mounting portions 27e of the right crank arm 27a. The first pedal attachment surface S1 is substantially parallel to the second transverse center plane A2.

The first pedal attachment surface S1 faces outwardly from the second transverse center plane A2 in the axial direction. In other words, the first pedal attachment surface S1 is an outermost surface of the right crank arm 27a in the axial direction. The outermost surface of the right crank arm 27a is a plane which is furthest on the right crank arm side from the second transverse center plane A2 in the axial direction.

The left crank arm 27b includes a second pedal attachment surface S2. The second pedal attachment surface S2 is provided on the left crank arm 27b.

Specifically, the second pedal attachment surface S2 is provided on the pedal axle mounting portions 27f of the left crank arm 27b. The second pedal attachment surface S2 is substantially parallel to the second transverse center plane A2.

The second pedal attachment surface S2 faces outwardly from the second transverse center plane A2 in the axial direction. In other words, the second pedal attachment surface S2 is an outermost surface of the left crank arm 27b in the axial direction. The outermost surface of the left crank arm 27b is a plane which is furthest on the left crank arm side from the second transverse center plane A2 in the axial direction.

The first transverse center plane A1 and the second transverse center plane A2 are positioned between the first pedal attachment surface S1 and the second pedal attachment surface S2 in the axial direction.

A first axial distance D1 is defined between the first pedal attachment surface S1 and the second pedal attachment surface S2 in the axial direction. In other words, the first axial distance D1 is an interval between the first pedal attachment surface S1 and the second pedal attachment surface S2 in the axial direction.

The first axial distance D1 is smaller than or equal to 170 mm. More preferably, the first axial distance D1 is smaller than or equal to 165 mm. Also, the first axial distance D1 is larger than or equal to 90 mm. In the illustrated embodiment, the first axial distance D1 is set to 165 mm.

A second axial distance D2 is defined between the first transverse center plane A1 of the front sprocket 45 and the second transverse center plane A2 of the crank axle 51 in the axial direction. In other words, the second axial distance D2 is an interval between the first transverse center plane A1 and the second transverse center plane A2 in the axial direction.

The second axial distance D2 is smaller than the first axial distance D1. For example, the second axial distance D2 is larger than or equal to 55 mm. More preferably, the second axial distance D2 is larger than or equal to 57 mm. Also, the second axial distance D2 is smaller than or equal to 85 mm. In the illustrated embodiment, the second axial distance D2 is set to 57.5 mm.

Figure 4:
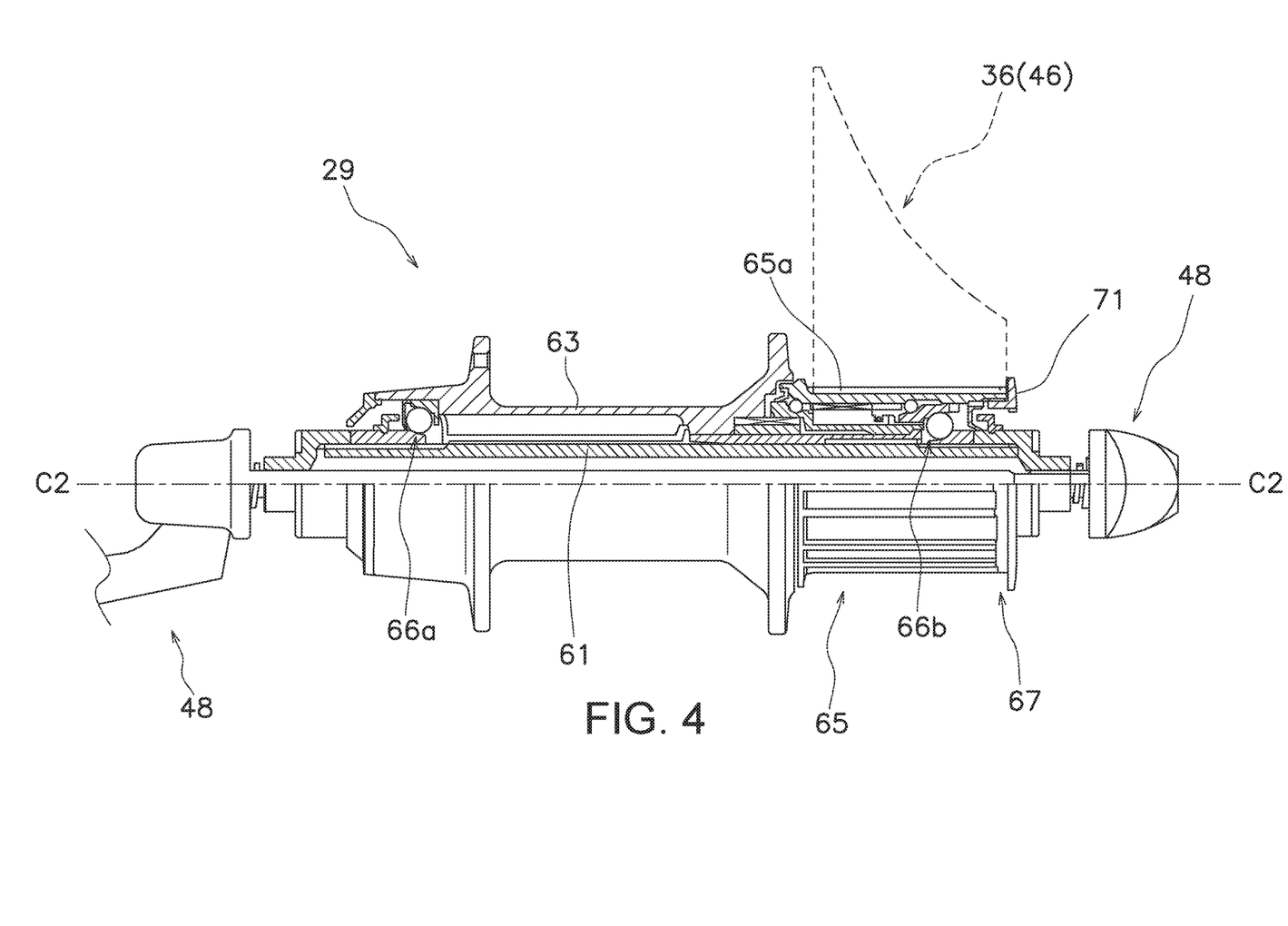
FIG. 4 is a partial cross sectional-elevational view of the rear hub assembly illustrated in FIG. 1 according to the illustrated embodiment.
Figures 5A, 5B:
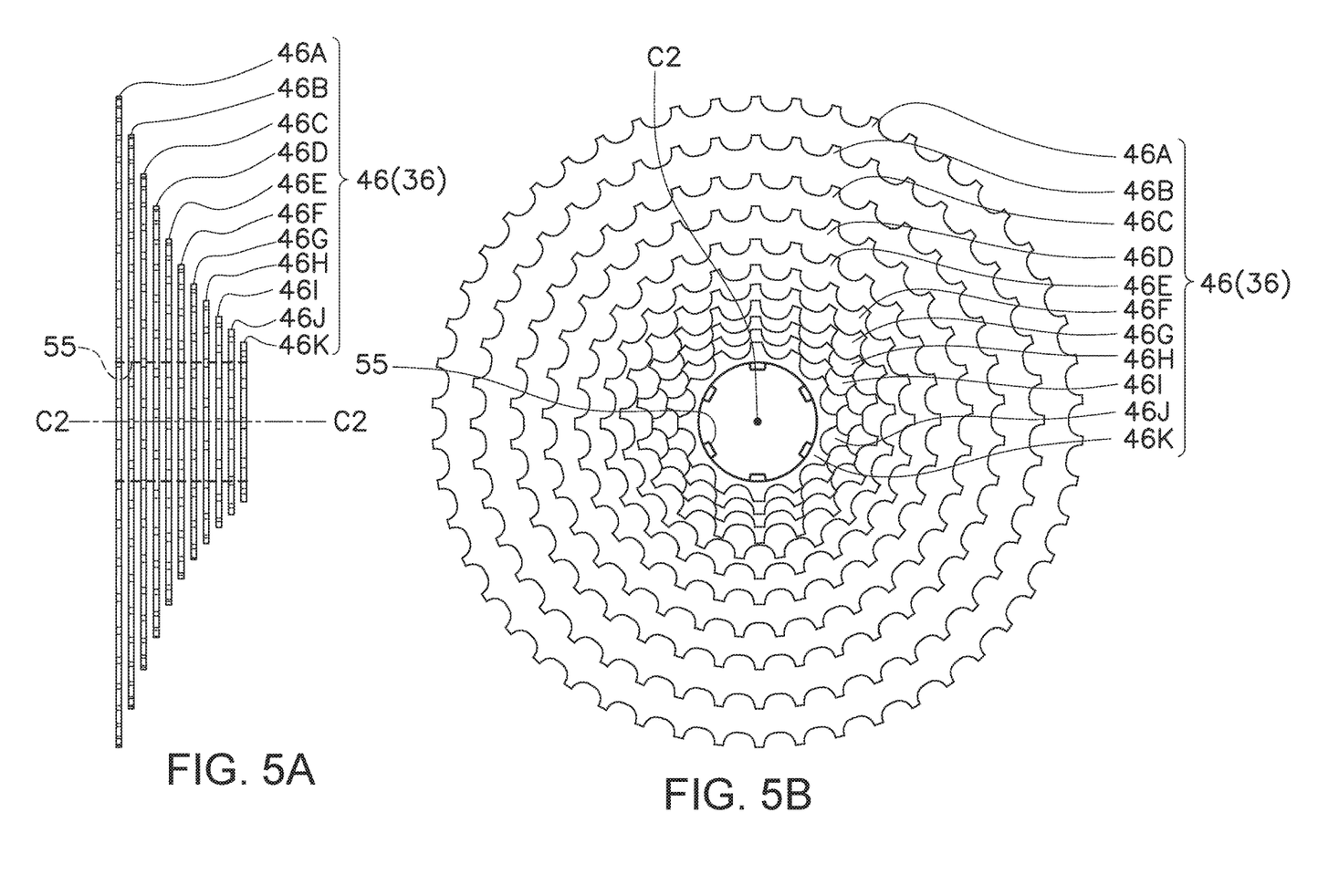
FIG. 5A is an edge elevational view of a rear sprocket assembly according to the other embodiment.
FIG. 5B is an outer facing side elevational view of the rear sprocket assembly illustrated in FIG. 5A.

As shown in FIGS. 4, 5A and 5B, the rear hub assembly 29 is supported on the rear portion of the frame 11, for example, between the rear ends 11j in the axial direction. The rear hub assembly 29 mainly includes a rear hub axle 61, a rear hub shell 63, and a sprocket mounting portion 65. A rear sprocket assembly 36 is mounted to the sprocket mounting portion 65.

Both ends of the rear hub axle 61 are supported on the rear part of the frame 11, for example, the rear ends 11j of the frame body 11a. The rear hub axle 61 is mounted on the rear ends 11j with a wheel securing mechanism 48. The wheel securing mechanism 48 is the substantially same as the conventional mechanism.

The rear hub shell 63 is rotatably mounted on the rear hub axle 61 via a bearing 66a. The rear hub shell 63 has a rotational center axis C2 that is also a rotational center axis of the rear hub axle 61.

The sprocket mounting portion 65 is mounted on the rear hub shell 63 around the rear hub axle 61, The sprocket mounting portion 65 has a plurality of splines 65a on an outer peripheral surface. The sprocket mounting portion 65 rotates integrally with the rear hub shell 63 with respect to the rear hub axle 61 via a bearing 66b. A rotational center axis of the sprocket mounting portion 65 corresponds to the rotational center axis C2 of the rear hub shell 63. The rear wheel 19 is attached to the rear hub shell 63 e.g. via bicycle spokes.

The rear sprocket assembly 36 is non-rotatably supported by the sprocket mounting portion 65. The rear sprocket assembly 36 rotates with the sprocket mounting portion 65.

The rear sprockets 46 include a first rear sprocket 46A, a second rear sprocket 46B, a third rear sprocket 46C, a fourth rear sprocket 46D, a fifth rear sprocket 46E, a sixth rear sprocket 46F, a seventh rear sprocket 46G, an eighth rear sprocket 46H, a ninth rear sprocket 46I, a tenth rear sprocket 46J, and a eleventh rear sprocket 46K.

The rear sprockets 46A-46K are arranged from the first rear sprocket 46A to the eleventh rear sprocket 46K in order in the axial direction. The first rear sprocket 46A is disposed on a side of the sprocket mounting portion 65 closet to the rear hub shell 63. The eleventh rear sprocket 46K is disposed on a side of the sprocket mounting portion 65 closet to the frame 11 (the frame body 11a). The rear sprockets 46B-46J are disposed between the first rear sprocket 46A and the eleventh rear sprocket 46K. A spacer (not shown) is disposed between each of two sprockets which are adjacent to each other in the first to eleventh rear sprockets 46A-46K.

The rear sprockets 46A-46K are engaged to the sprocket mounting portion 65 with a spline engagement, Each of the rear sprockets 46A-46K has a center hole with a plurality of splines 55. The splines 55 of the rear sprockets 46A-46K are engaged to the splines 65a on the outer peripheral surface of the sprocket mounting portion 65. In this condition, the rear sprockets 46A-46K are retained on the sprocket mounting portions 65 with a lock nut 71.

The tooth number of the first rear sprocket 46A is forty six. The tooth number of the second rear sprocket 46B is forty. The tooth number of the third rear sprocket 46C is thirty five. The tooth number of the fourth rear sprocket 46D is thirty one. The tooth number of the fifth rear sprocket 46E is twenty seven. The tooth number of the sixth rear sprocket 46F is twenty four. The tooth number of the seventh rear sprocket 46G is twenty one. The tooth number of the eighth rear sprocket 46H is nineteen. The tooth number of the ninth rear sprocket 46I is sixteen. The tooth number of the tenth rear sprocket 46J is thirteen. The tooth number of the eleventh rear sprocket 46K is eleven.

The configuration of the above rear hub assembly 29 is arranged as follows. As shown in FIG. 3, the rear hub assembly 29 is disposed between the rear ends 11j.

A third axial distance D3 is defined between the rear ends 11j in the axial direction. In other words, the third axial distance D3 is an interval between opposite surfaces of the rear ends 11j in the axial direction. For example, the third axial distance D3 is larger than or equal to 148 mm. More preferably, the third axial distance D3 is larger than or equal to 150 mm. In this embodiment, the third axial distance D3 is set to 150 mm.

Other Embodiments (a) In the illustrated embodiment, the description has been given to the example of the case in which the present invention is applied to a mountain bicycle. Instead of this, the present invention can be applied to a road bike and/or a city bike etc.

(b) In the illustrated embodiment, the description has been given to the example of the case in which the front sprocket assembly 35 has one front sprocket i.e. a single front sprocket). The number of the front sprocket is not restricted to the illustrated embodiment but can be set optionally more than or equal to two. In such a case, the first transverse center plane A1 is defined by using a largest sprocket of the group of front sprockets. In other words, the first transverse center plane A1 includes a center of a largest sprocket in the axial direction.

Figure 6:
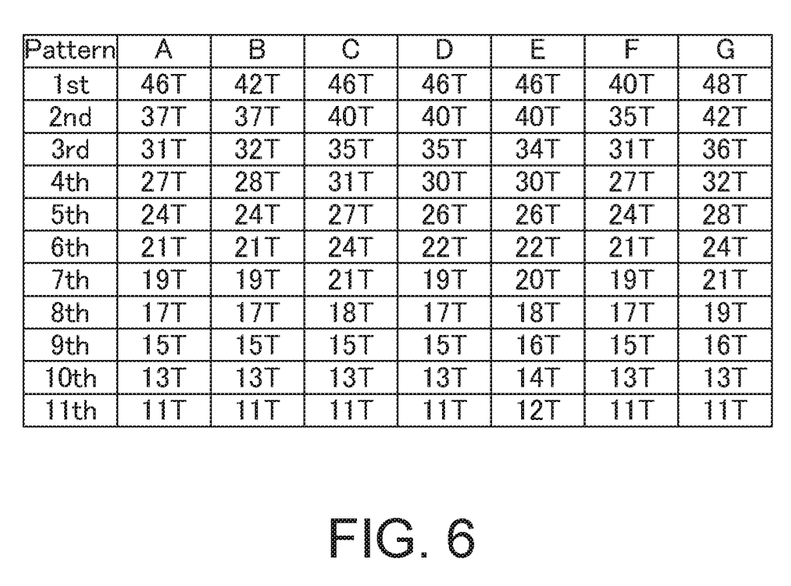
FIG. 6 is a table indicating tooth numbers of rear sprockets according to the other embodiment of the present invention illustrated in FIGS. 5A and 5B.

(c) In the illustrated embodiment, the description has been given to the example of the case in which the tooth numbers of the rear sprockets 46A-46K are 46, 40, 35, 31, 27, 24, 21, 19, 16, 13, and 11. The tooth numbers are not restricted to the embodiment but can be changed optionally. For example, the tooth numbers of the rear sprockets 46A-46K can be set to any one of patterns A-G in FIG. 6. Noted that "T" is an abbreviation of "teeth" in FIG. 6.

(d) In the illustrated embodiment, the description has been given to the example of the case in which the third axial distance D3 is set to 150 mm. The third distance D3 is not restricted to the embodiment but can be set to a value which is larger than or smaller than 150 min.

(e) In the illustrated embodiment, the description has been given to the example of the case in which the width of the rear tire 19a is 2.8 inch. The width of the rear tire 19a is not restricted to the embodiment but can be set to a width which is larger than or smaller than 2.8 inch.

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the bicycle crank assembly. Accordingly, these terms, as utilized to describe the present technology should be interpreted relative to the bicycle crank assembly.

The term "configured" as used herein to describe a component, section, or part of a device implies the existence of other unclaimed or unmentioned components, sections, members or parts of the device to carry out a desired function. The terms of degree such as "substantially", "about" and "approximately" as used herein mean an amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment.

It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

What is claimed is:

1. A driving portion for a bicycle comprising: a bicycle crank assembly comprising:
   a sprocket including a first transverse center plane that is transverse to the rotational center axis;
   a crank axle including a second transverse center plane that is transverse to the rotational center axis;
   a first crank arm including a first pedal attachment surface; and
   a second crank arm including a second pedal attachment surface; and
   a rear sprocket assembly having
      a largest sprocket with a tooth count of forty, forty-two, forty-six, or forty-eight, and
      a smallest sprocket having a tooth count of eleven or twelve,
      the tooth count of the largest sprocket being forty-six in the case of the tooth count of the smallest sprocket being twelve,
   the first pedal attachment surface being spaced from the second pedal attachment surface in an axial direction parallel to the rotational center axis by a first axial distance that is smaller than or equal to 170 mm, and
   the first transverse center plane of the sprocket being spaced from the second transverse center plane of the crank axle in the axial direction by a second axial distance that is larger than or equal to 55 mm.

2. The driving portion according to the claim 1, wherein first axial distance is smaller than or equal to 165 mm.

3. The driving portion according to the claim 1, wherein the second axial distance is larger than or equal to 57 mm.

4. The driving portion according to the claim 1, wherein the first axial distance is larger than or equal to 90 mm.

5. The driving portion according to the claim 1, wherein the second axial distance is smaller than or equal to 85 mm.

6. The driving portion according to the claim 1, wherein the total number of the sprocket consists of one.

7. The driving portion according to the claim 1, wherein the second axial distance is smaller than the first axial distance.

8. The driving portion according to the claim 1, wherein the first transverse center plane and the second transverse center plane are positioned between the first pedal attachment surface and the second pedal attachment surface in the axial direction.

9. The driving portion according to the claim 1, wherein the first pedal attachment surface and the second pedal attachment surface face outwardly from the second transverse center plane in the axial direction, respectively.

10. The driving portion according to the claim 1, wherein the crank axle includes a first axial end surface and a second axial end surface opposite to the first axial end surface with respect to the second transverse center plane; and the second transverse center plane is positioned in a middle position in the axially direction between the first axial end surface and the second axial end surface.

\* \* \* \* \*